A. WINTON.
TRANSMISSION MECHANISM.
APPLICATION FILED OCT. 8, 1913.
1,178,284.
Patented Apr. 4, 1916.
4 SHEETS—SHEET 4.
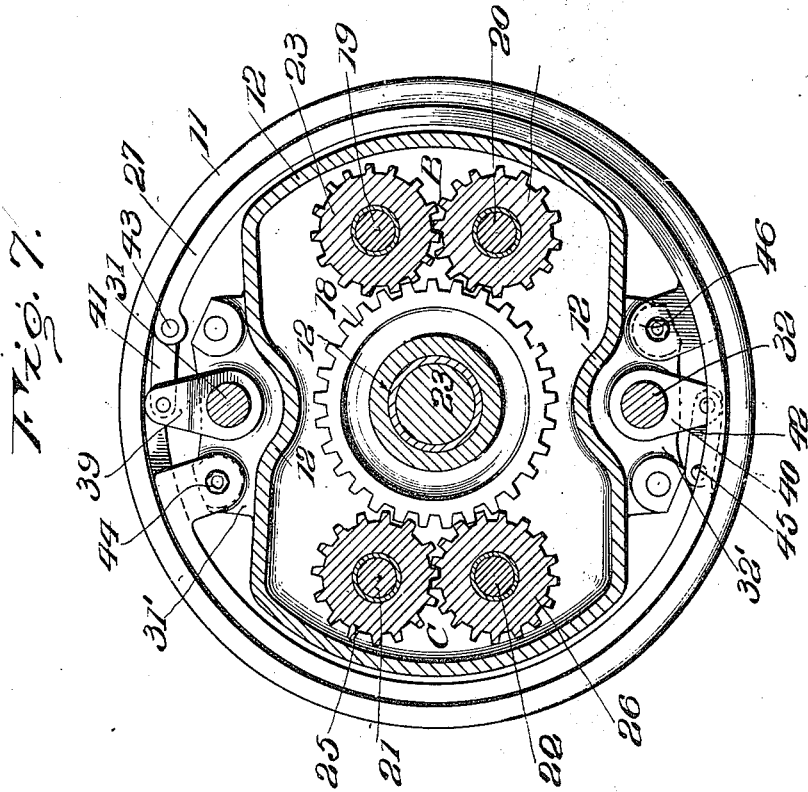
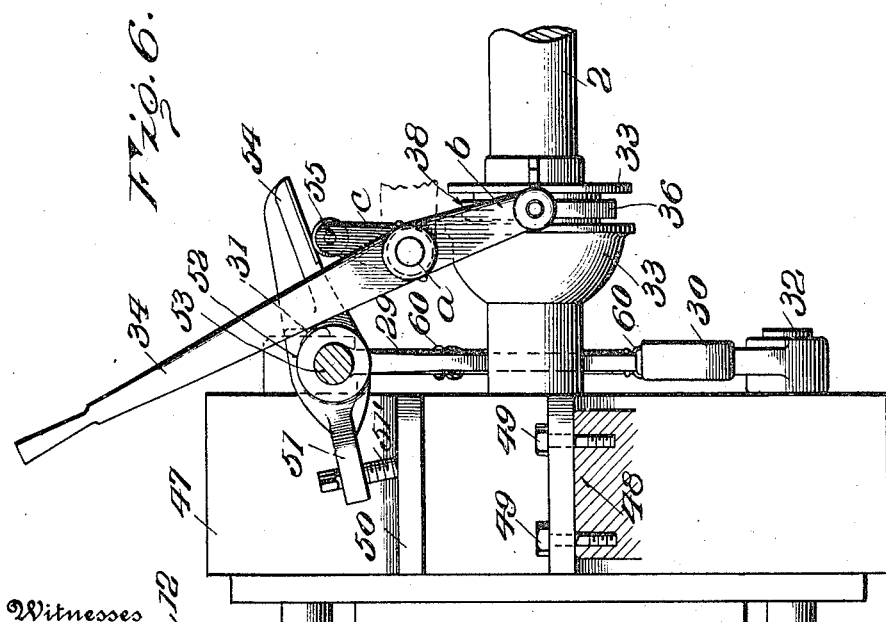
Witnesses
W. A. Williams
L. L. Puket
Inventor
A. Winton
By A. S. Pattison.
Attorney

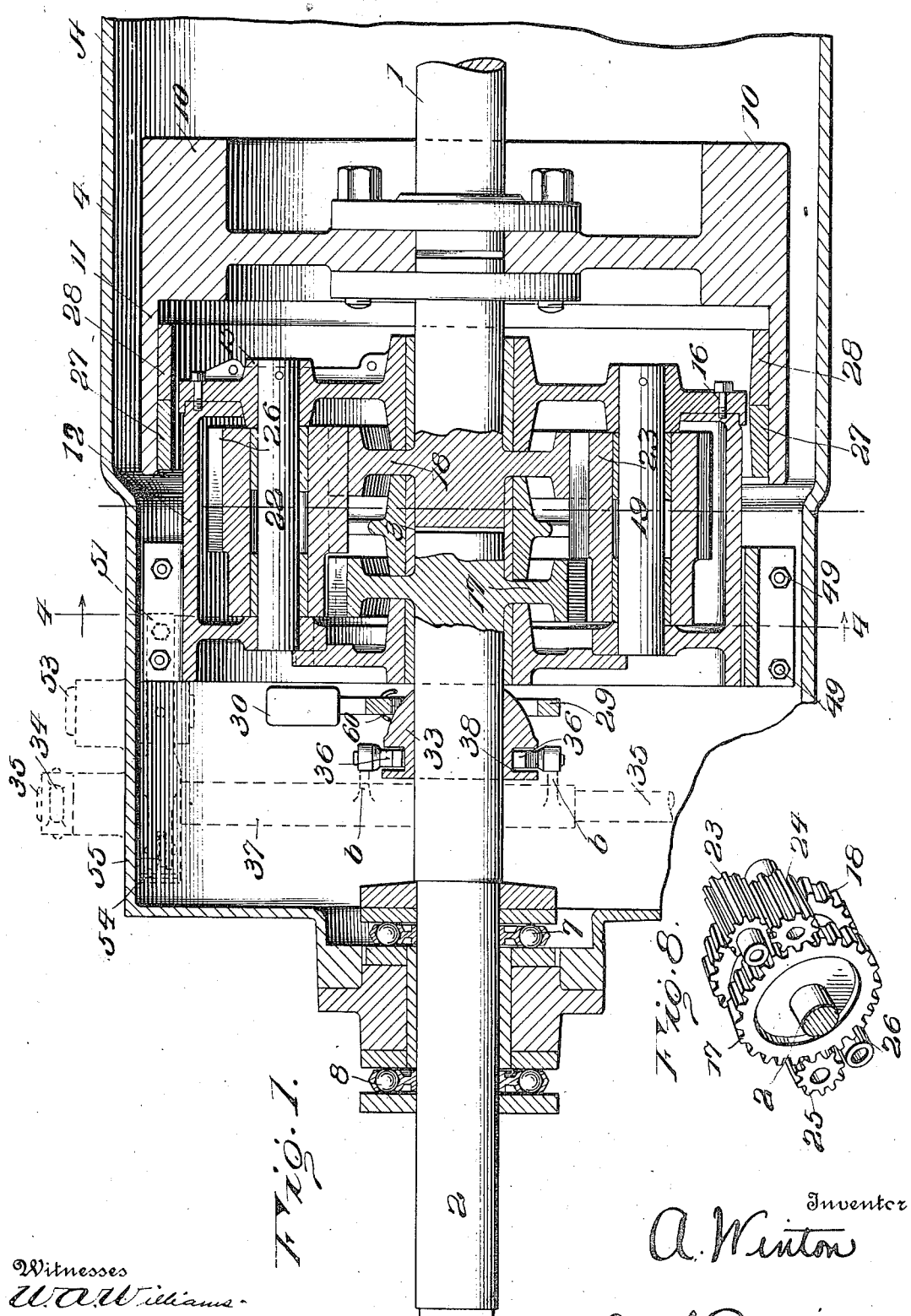

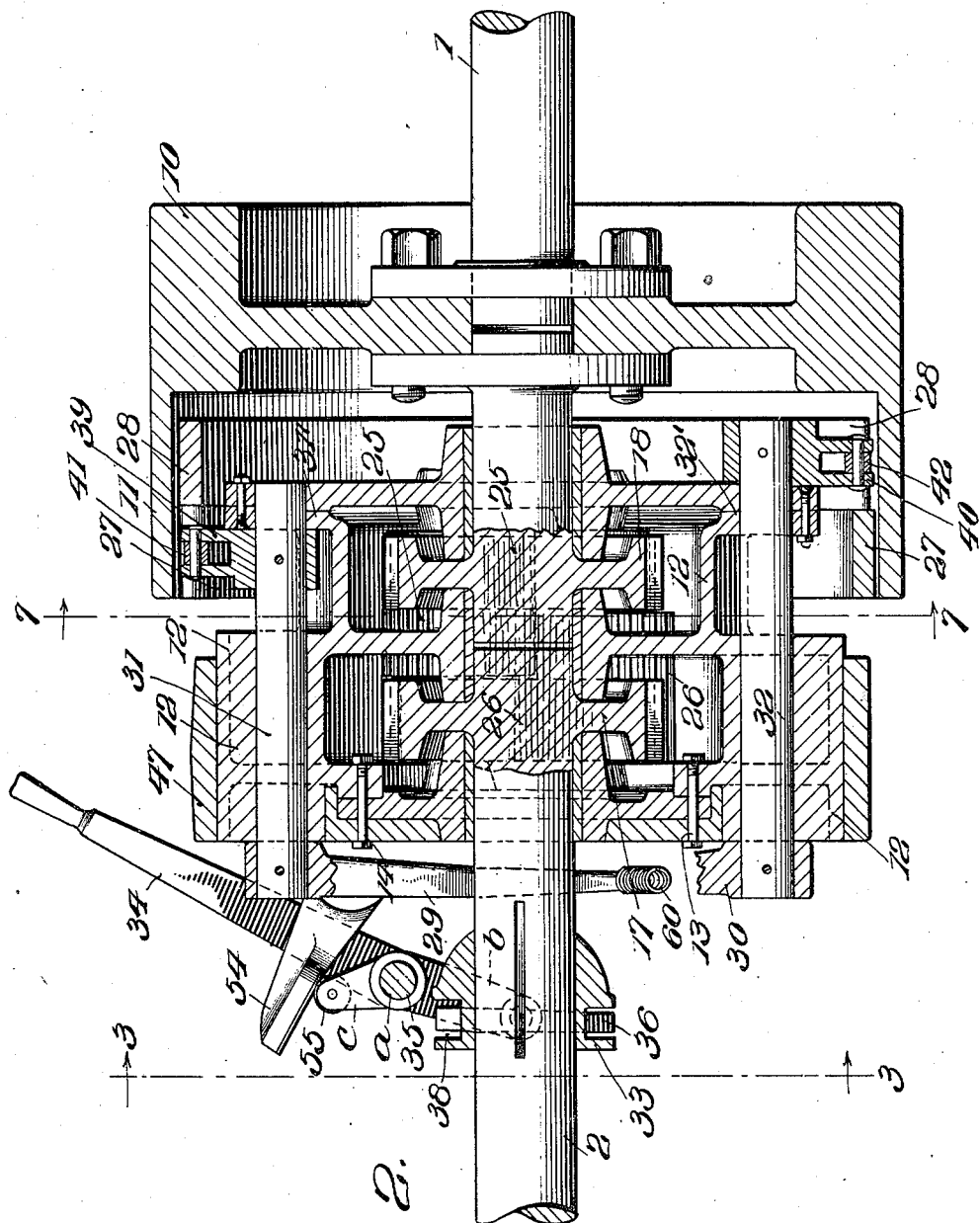

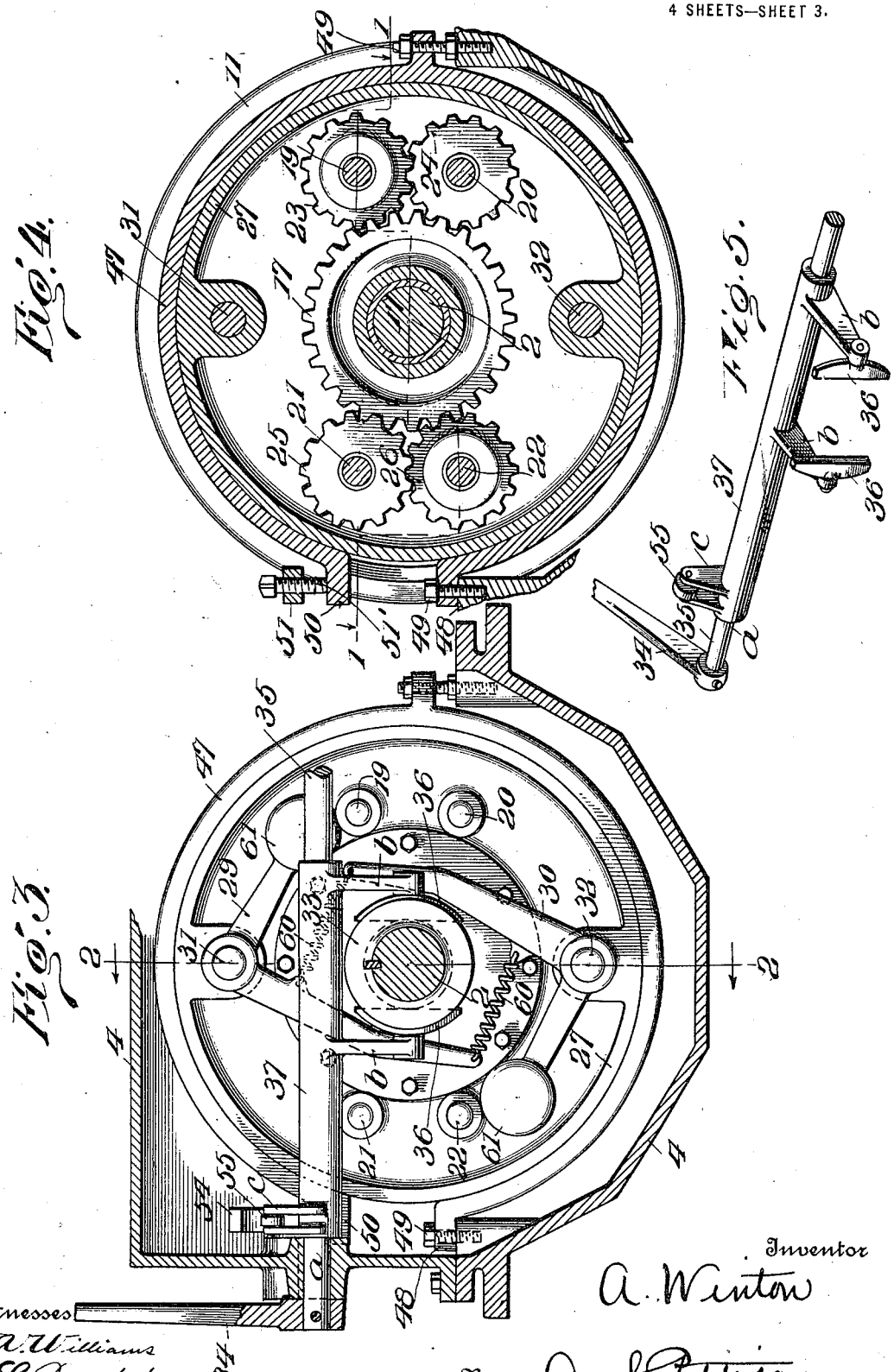

UNITED STATES PATENT OFFICE.

ALEXANDER WINTON, OF CLEVELAND, OHIO, ASSIGNOR TO WINTON GAS ENGINE AND MANUFACTURING COMPANY, OF CLEVELAND, OHIO.

TRANSMISSION MECHANISM.

1,178,284.      Specification of Letters Patent.      Patented Apr. 4, 1916.

Application filed October 8, 1913. Serial No. 793,989.

*To all whom it may concern:*

Be it known that I, ALEXANDER WINTON, a citizen of the United States, residing at Cleveland, in the county of Cuyahoga and State of Ohio, have invented certain new and useful Improvements in Transmission Mechanisms, of which the following is a specification, reference being had therein to the accompanying drawing.

This invention relates to improvements in transmission or reverse mechanisms, and is more particularly intended for use in connection with marine engines, though it is capable of use with other kinds of power plants or engines.

The transmission mechanism here shown is of the planetary type, and the primary object of the present invention lies in the construction and simplicity of the arrangement by means of which all of the weight of the transmission mechanism is attached to the fly-wheel, and in this way reduces the total weight.

A further object of the present invention is to so relatively arrange and construct the transverse mechanism that it partially extends within an integral sleeve of the fly-wheel of the engine or motor, whereby the transmission mechanism is placed directly against and is practically a continuation of the motor which serves to considerably shorten the overall length of the combined motor and transmission mechanism, which is a result of importance and moment, especially in marine constructions where oftentimes space is one of the important factors.

A further object of the present invention is to inclose the engine fly-wheel and transmission mechanism within an extension of the crank case, which makes an extremely compact, strong, simple arrangement and thereby practically incloses the whole motor and transmission mechanism within the motor casting and the crank case extension. This is particularly advantageous in marine construction in that thus inclosing all of the parts makes the whole plant cleanly and practically noiseless. Both of these latter results are highly desirable in motor plants, especially for marine purposes where they are inclosed in a room or compartment which is occupied by one or more persons.

Further objects of the present invention are the result of the foregoing arrangement and construction and will appear more fully from the full specification.

In the accompanying drawings: Figure 1 is a central sectional view of my improved mechanism taken on the line 1—1 of Fig. 4, looking in the direction of the arrow. Fig. 2 is a central sectional view of my improved reverse mechanism, taken on the line 2—2 of Fig. 3, looking in the direction of the arrow. Fig. 3 is a sectional view taken on the line 3—3 of Fig. 2, looking in the direction of the arrow. Fig. 4 is a sectional view taken on the line 4—4 of Fig. 1, looking in the direction of the arrow. Fig. 5 is a detail perspective view of the operating lever and its coöperating parts. Fig. 6 is an enlarged side elevation showing the operating lever and clutch ball in connection with the reverse clutch band. Fig. 7 is a sectional view taken along the line 7—7 of Fig. 2, looking in the direction of the arrow. Fig. 8 is a detached perspective of the pinions and master gears.

The arrangement of the gears of the transmission is of the well-known planetary type which is well understood by those skilled in the art and it will not require any extended description.

The present invention does not pertain to the arrangement of gears *per se* for that is old, but pertains to the relative arrangement of the transmission and its operating parts in respect to the engine and its fly-wheel, whereby the desirable results enumerated in the foregoing objects are obtained.

Referring now to the drawings in which like reference numerals designate similar parts, A is a portion of the engine crank case and 1 is the engine crank shaft in axial alinement with which is a driven or propeller shaft 2. The adjacent ends of the two shafts are separated as at 3, to prevent them from touching and obviating the friction which would occur between the engaging ends when the two shafts are rotated in opposite directions. Extending rearwardly from the crank case A and preferably integral therewith is the transmission housing 4, which entirely incloses the engine fly-wheel 10 and the transmission to be described hereinafter. In this arrangement it will be observed that the engine fly-wheel is placed at the rear end of the engine and in juxtaposition to the transmission mechanism. The most common arrangement in marine engines is to have the fly-wheel at the opposite or front end thereof.

In the arrangement here shown and which constitutes a part of the present improvement, a transmission case 12 has its front end placed within a sleeve or extension 11 of a fly-wheel 10, the transmission case being smaller in diameter than the internal diameter of the flange 11 of the fly-wheel 10. It will be observed in this arrangement that the transmission case 12 is made sufficiently smaller in diameter than the diameter within the flange 11, of the fly-wheel to permit the interposition of the go-ahead clutch bands 27 and 28. These clutch bands are external in respect to the transmission case 12 and internal in respect to the integral flange 11. As will appear presently, these clutch bands 27 and 28 are internally expanded in respect to the flange 11, whereby when they are expanded they engage the inner surface of the flange 11, and when contracted they disengage the said flange.

The gear arrangement within the case 12 is of the well-known type of planetary reverse and comprises four pinions 23, 24, 25 and 26 which are arranged in pairs at opposite sides of the axes of the shafts 1 and 2. The outer end of the engine shaft 1, carries a master gear 18, while the adjacent end of the driven or propeller shaft 2 carries a master-gear 17. These pinions are arranged to over-lap each other at their inner ends, as shown in Fig. 2 (as is well-understood) and these overlapping portions intermesh. By reason of this arrangement the pinions may be said to extend in opposite directions.

For the purpose of convenience in description the pinions will be designated as pairs B and C. The two pinions of each pair mesh with each other, and one pinion of each pair meshes with the master gear 17, and the other pinion of each pair meshes with the master gear 18.

Referring now to the mechanism for expanding the go-ahead clutch bands 27 and 28, it will be observed that these two bands are located side by side and that each band is almost a complete circle. The band 27 has one end attached to the transmission case 12, at the point 44, while its free end is connected with an arm 39 by means of a link 41. This arm 39 is carried by a shaft 31, whereas the band 28 extends in the opposite direction and has one end attached to the transverse case 12 at the point 46 and its opposite free end 45 connected with an arm 40, by means of a link 42 and the arm 40 is carried by a shaft 32. These shafts 31 and 32 extend through the gear case 12 and are located on opposite sides of the axes of the shafts 1 and 2. As shown, the said shafts project through and beyond the rear end of the gear case and carry the actuating arms 29 and 30.

Referring now particularly to Fig. 3, it will be seen that the arms 29 and 30 extend in opposite directions and are located at opposite sides of the shaft 2. When these arms are forced outward the shafts 31 and 32 are rocked and through the medium of the arms 39 and 40 and the links 41 and 42, the go-ahead clutch bands 27 and 28 are expanded into contact with the inner surface of the fly-wheel flange 11. Such engagement causes the transmission case 12 to rotate with the fly-wheel, and by reason of the well-known arrangement of the pinions and master gears the shafts 1 and 2 are caused to rotate in the same direction and at the same rate of speed. That is, when the gear case and fly-wheel are locked together the pinions and master gears lock the shafts 1 and 2, so that they are in effect a single shaft and rotate together. Contracting springs 60 connect the arms or levers 29 and 30, so that normally they are drawn together and toward the shaft 2 and normally hold the clutch bands contracted and normally out of contact with the fly-wheel flange 11.

The reversing mechanism comprises a reversing clutch band 47, which surrounds the rear end of the transmission case 12, as shown in Figs. 2, 3 and 4. One end of this reverse clutch band is fastened to the housing 4 at a point 48 by a bolt 49, whereas the opposite free end 50 has a laterally extending lug or extension 50'. An intermediately pivoted lever 52 is suitably supported on a shaft or stud 53, which is carried by the housing 4. One end 51 of this internally pivoted lever 52 carries one or more adjusting screws 51', adapted to engage the free end 50 of the clutch band and contract the clutch band around the end of the transmission case for the purpose of holding it against rotation. When the transmission case is held against rotation, the engine shaft 1 through the well-known arrangement of the pinions and master gears transmit a reverse motion or rotation to the driven or propeller shaft 2.

Means is arranged for operating the mechanisms which control the go-ahead clutch bands and the reverse clutch bands. This means may be operated manually or otherwise. For the purpose of illustration a manually operated lever 34 is shown and is attached to a shaft 35 which is carried by the housing 4, as shown in Fig. 1. Referring now particularly to Figs. 5 and 6, this shaft has attached to it a sleeve or enlargement 37, and this sleeve carries parallel projecting arms b, the outer ends of which carry the intermediate pivoted members 36, which in turn project into an annular groove 38 formed in the cone-shaped member 33. Projecting also from the sleeve 37 and as here shown is an arm $c$ which carries at its outer end a roller 55. This arm is located under the end 54 of the intermediate pivoted lever 52, as shown in Fig. 6.

When the hand-operated lever 34 is in the position shown in Fig. 2, the arm $c$ actuates the intermediately pivoted lever 52 and causes its opposite end to act on the free end of the reverse clutch band 47 and contract it around the transmission case and hold it against rotation. This operation through the medium of the pinions, as above explained, causes the driven or propeller shaft 2 to rotate in a direction opposite to the rotation of the engine shaft. When the operating lever 34 is placed in an upright or neutral position the go-ahead and reverse clutch bands are out of contact with the fly-wheel and the transmission case 12 and permits the shaft 1 to rotate without rotating the propeller or driven shaft 2. By placing the lever 34 in the position opposite to that shown in Fig. 1, the cone 33 is moved inward thus separating the arms 29 and 30 and through the mechanism above described the go-ahead clutch bands 27 and 28 are expanded and engage the inner surface of the fly-wheel flange 11, thus causing the transmission case and the shaft 2 to rotate in the same direction and at the same speed as the fly-wheel and engine crank shaft.

As shown in Fig. 1 thrust bearings 7 and 8 are provided for taking care of the thrust for going ahead and reversing. Since these thrust bearings are of the common well-known type, further description is unnecessary.

Having thus described my invention, what I claim and desire to secure by Letters Patent is;

1. The combination with an engine fly-wheel having a laterally projecting annular clutch engaging flange, of a gear-case having one end projecting within and embraced by the said flange, a drive shaft, a driven shaft, said gear-case being mounted on the drive shaft and the driven shaft, gearing within the gear-case, an expanding clutch member carried by the gear-case and located between it and the said flange, a brake surrounding the opposite end of the case, and means for expanding and contracting the clutch member and brake to retard the rotation of the case and operatively connect the gear-case and fly wheel respectively.

2. The combination with an engine fly-wheel having an outwardly extending annular flange, of a gear-case having one end projecting within and embraced by the said flange, a driven shaft, a drive shaft the said gear-case being mounted upon the drive shaft and the driven shaft, a gearing within the said gear-case, two expanding and contracting clutch bands located side by side and between the flange and the case and carried by the said case, a brake surrounding the opposite end of the case, and means for expanding and contracting said clutch bands and brake to retard the rotation of the case and operatively connect the gear-case and fly wheel respectively.

3. The combination with an engine fly-wheel of a reversing mechanism comprising a case and gearing therewithin, one end of the case projecting within the fly-wheel, a go-ahead expanding clutch member located between the flange and the said case and carried by the said case, a contracting brake surrounding the opposite end of the case, and means for operating the clutch and brake to retard the rotation of the case and operatively connect the gear-case and fly-wheel respectively, whereby the weight of the case is carried by the fly-wheel and a compact arrangement of the engine and case is accomplished for the purpose described.

4. A reversing transmission mechanism comprising a case, reversing gearing carried thereby, a fly-wheel, an expanding go-ahead clutch band surrounding one end of the case and adapted to frictionally engage the fly-wheel, a drive shaft and driven shaft connected with the said gearing, a contracting brake surrounding the other end of the case, and adapted to frictionally engage the case, and means for operating the said clutch and brake and thereby controlling the driven shaft.

5. The combination with an engine fly-wheel having an outwardly extending annular flange, of a transmission mechanism comprising a case, reversing gearing therewithin, an expanding go-ahead clutch band surrounding one end of the case and carried thereby, a brake surrounding the other end of the case, a shaft extending longitudinally of the case and having one end operatively connected to the clutch band to expand and contract it and thereby lock and release the said case and fly-wheel, the opposite end of the said shaft carrying an inwardly extending arm, and means for forcing the arm outwardly and rocking the shaft to expand the clutch-band, and means for operating the brake for the purpose described.

6. A transmission mechanism comprising in combination a member having a clutch engaging surface, a case adjacent thereto, gearing within said case, two go-ahead clutch bands surrounding one end of the case and located side by side, one end of the bands connected to the case and the bands extending around the case in opposite directions, two shafts located at opposite sides of the case and extending longitudinally thereof, the inner end of the shaft connected to the free ends of the clutch bands to expand and contract them and thereby lock and release the gear-case to and from the clutch-engaging surface, arms attached to the opposite ends of the shafts, the arms extending inwardly at opposite sides of the axis of the case, a reversing band surrounding the opposite end of the case, means for alternately separating the arms and thereby alternately expanding the clutch-bands and contracting the reversing band, the parts arranged as and for the purpose described.

7. A reversing transmission mechanism comprising in combination a member having a clutch engaging surface, a case adjacent thereto, reversing gearing carried thereby, an expanding go-ahead clutch-band surrounding one end of the case and carried thereby, a brake surrounding the other end of the case, a shaft extending longitudinally of the case and having one end operatively connected to the clutch-band to expand and contract it and thereby lock and release the said case to and from the clutch engaging surface, the opposite end of the shaft carrying an inwardly extending arm, and means for forcing the arm outwardly and rocking the shaft to expand and contract the clutch-band, and means for operating the brake for the purpose described.

8. A reversing transmission mechanism comprising a case, reversing gearing carried within the case, a fly-wheel adjacent said case, a contracting brake member at one end of the case, and an expanding clutch member at the other end of the case and carried thereby, one of the said members coöperating with the fly-wheel for a go-ahead transmission, and the other member coöperating with the said case for a reversing transmission.

9. A reversing transmission mechanism comprising a case, a reversing gearing carried within the case, a fly-wheel adjacent said case, independent clutch and brake members respectively located at opposite ends of the case, the said clutch member carried by the case, said members movable transversely of the case and fly-wheel to retard the rotation of the case and operatively connect the gear case and fly wheel respectively substantially as and for the purpose described.

10. A reversing transmission mechanism comprising a case, reversing gearing carried thereby, a fly wheel, a go-ahead clutch member carried by the case and adapted to frictionally engage the fly wheel, a drive shaft and a driven shaft, a brake adjacent the case and adapted to frictionally engage the said case, and means for operating the said clutch and brake and thereby controlling the driven shaft.

11. A reversing transmission mechanism comprising a case, reversing gearing carried thereby, a fly wheel, a go-ahead clutch member between the case and the fly wheel and adapted to connect the case and fly wheel together, a drive shaft and a driven shaft, a brake adjacent the case and adapted to frictionally engage the said case and retard the rotation thereof and means for alternately operating the said clutch and brake and thereby controlling the driven shaft.

12. A reversing transmission mechanism comprising a case, reversing gearing carried thereby, a fly wheel, a go-ahead clutch member adapted to connect the case and fly wheel together, a drive shaft and a driven shaft, a brake adjacent the case and adapted to engage the said case and retard the rotation thereof and means for alternately operating the said clutch brake and thereby controlling the driven shaft.

In testimony whereof I hereunto affix my signature in the presence of two witnesses.

ALEXANDER WINTON.

Witnesses:
 HAROLD B. ANDERSON,
 BYRON B. BROCKWAY.